US009840640B2

United States Patent
Maliverney et al.

(10) Patent No.: US 9,840,640 B2
(45) Date of Patent: *Dec. 12, 2017

(54) ARTICLE HAVING ANTIFOULING PROPERTIES FOR AQUATIC AND PARTICULARLY SEA USE

(75) Inventors: Christian Maliverney, Saint Julien sur Bibost (FR); Stefan Breunig, Villette de Vienne (FR); Delphine Blanc, Lyons (FR)

(73) Assignee: BLUESTAR SILICONES FRANCE, Saint Fons (FR)

( * ) Notice: Subject to any disclaimer, the term of this patent is extended or adjusted under 35 U.S.C. 154(b) by 698 days.

This patent is subject to a terminal disclaimer.

(21) Appl. No.: 12/994,434

(22) PCT Filed: May 28, 2009

(86) PCT No.: PCT/FR2009/000621
§ 371 (c)(1),
(2), (4) Date: May 9, 2011

(87) PCT Pub. No.: WO2009/156609
PCT Pub. Date: Dec. 30, 2009

(65) Prior Publication Data
US 2011/0212333 A1    Sep. 1, 2011

(30) Foreign Application Priority Data

May 29, 2008 (FR) ...................... 08 02914

(51) Int. Cl.
| | | |
|---|---|---|
| B32B 27/00 | (2006.01) |
| C09D 183/04 | (2006.01) |
| B08B 17/02 | (2006.01) |
| C09D 5/16 | (2006.01) |

(52) U.S. Cl.
CPC ............ C09D 183/04 (2013.01); B08B 17/02 (2013.01); C09D 5/1675 (2013.01); C09D 5/1687 (2013.01); C09D 5/1693 (2013.01); *Y10T 428/31663* (2015.04)

(58) Field of Classification Search
None
See application file for complete search history.

(56) References Cited

U.S. PATENT DOCUMENTS

| | | | |
|---|---|---|---|
| 3,702,778 A | 11/1972 | Mueller et al. | |
| 4,021,392 A | 5/1977 | Milne et al. | |
| 4,025,693 A | 5/1977 | Milne | |
| 4,248,993 A | 2/1981 | Takago | |
| 4,294,950 A | 10/1981 | Kato | |
| 4,404,348 A * | 9/1983 | Fau et al. ........................ 528/15 |
| 4,515,932 A | 5/1985 | Chung | |
| 4,525,565 A * | 6/1985 | Laisney ............... C08K 5/0091 524/860 |
| 4,528,353 A | 7/1985 | Lucas et al. | |
| 4,563,498 A | 1/1986 | Lucas | |
| 5,519,104 A | 5/1996 | Lucas | |
| 5,861,460 A * | 1/1999 | Hamada .................. B29B 7/402 524/423 |
| 5,958,116 A * | 9/1999 | Kishihara ............ C09D 5/1637 106/15.05 |
| 6,403,105 B1 | 6/2002 | Stein | |
| 8,772,428 B2 * | 7/2014 | Maliverney .......... C08K 5/0091 528/14 |
| 2007/0265409 A1 * | 11/2007 | Wakabayashi ........... C08K 5/16 528/28 |
| 2009/0042042 A1 * | 2/2009 | Yuki et al. ..................... 428/447 |
| 2010/0058955 A1 * | 3/2010 | Tanaka et al. ............ 106/287.13 |

FOREIGN PATENT DOCUMENTS

| | | | |
|---|---|---|---|
| CA | 991929 | 6/1976 | |
| CA | 1260186 | 9/1989 | |
| EP | 0051930 | 5/1982 | |
| EP | 0885933 A1 | 12/1998 | |
| EP | 1861401 A1 | 12/2007 | |
| FR | 2083029 | 10/1971 | |
| FR | 2083029 A5 | 12/1971 | |
| FR | 2266733 | 10/1975 | |
| FR | 2375305 | 7/1978 | |
| FR | 2375305 A1 | 7/1978 | |
| FR | 2557582 A1 | 7/1985 | |
| FR | 2557585 | 7/1985 | |
| FR | 2786497 A1 | 6/2000 | |
| GB | 1307001 A | 2/1973 | |
| GB | 1581727 | 12/1980 | |
| GB | 1581727 A | 12/1980 | |
| GB | 2118196 | 10/1983 | |
| GB | 2270522 A | 3/1994 | |
| JP | 2522854 B * | 5/1996 | ............. C08L 83/04 |
| JP | 2007224089 A | 9/2007 | |
| WO | 2004/020525 | 3/2004 | |
| WO | WO 2006109600 A1 * | 10/2006 | ............. B05D 5/00 |
| WO | WO 2007046357 A1 * | 4/2007 | |

OTHER PUBLICATIONS

JP 2522854 B English machine translation with abst from JP 04 106156 (1996).*
CAS Registry No. 5593070 4 SciFinder® American Chemical Society (ACS) (2015).*
Anonyme, "International Convention on the Control of Harmful Anti-Fouling Systems on ships, 2001," International Marine Organization (2001).

* cited by examiner

*Primary Examiner* — Kenneth Stachel
(74) *Attorney, Agent, or Firm* — McBee Moore Woodward & Vanik IP, LLC

(57) ABSTRACT

An article having antifouling properties and intended to be employed in aquatic uses, in particular marine uses. In particular there is provided an article having antifouling properties and intended to be employed in aquatic uses which comprises: a) a support, b) optionally, at least one primer coat on said support comprising at least one anticorrosive product, c) optionally, at least one intermediate primer coat promoting adhesion between the coats, d) at least one adhesion-promoting coat or tie coat, deposited on said primer coat or on said support when the primer coat is absent, and e) at least one antifouling coat or topcoat, deposited on said adhesion-promoting coat or tie coat.

20 Claims, No Drawings

ARTICLE HAVING ANTIFOULING PROPERTIES FOR AQUATIC AND PARTICULARLY SEA USE

CROSS REFERENCE TO RELATED APPLICATIONS

This application is a §371 National Stage Application of PCT/FR2009/000621, filed May 28, 2009, which claims priority to French Application 0802914 filed May 29, 2008.

BACKGROUND OF THE INVENTION

Field of the Invention

The present invention relates to an article having antifouling properties and intended to be employed in aquatic uses, in particular marine uses, and also to a method for delaying the growth of aquatic organisms on submersible or semi-submersible structures.

Description of Related Art

The invention relates to the field of antifouling marine paints. Antifouling marine paints are topcoats intended to prevent the attachment of animals or plants to the lower parts of the hull of ships. They are used for reasons of safety, maintaining the maneuverability of ships, reducing fuel consumption, combating corrosion and weighing-down of structures.

The problem of "biofouling" constitutes a major problem resulting from the immersion of materials in marine environments. The prevention of this phenomenon represents a considerable maintenance cost.

Specifically, the formation of "biofouling" or "fouling" occurs during immersion in seawater, where a layer of organic and inorganic molecules is adsorbed to the surface of the material extremely rapidly. This layer of adsorbed material, or biofilm, serves as a mediator for the adhesion of the bacteria present in suspension in the marine environment.

This colonization of the surface by marine bacteria is rapid and a stationary state is reached after a period of a few hours to a few days. Finally, other marine organisms colonize the surface, the adherent bacteria recruiting these other organisms. All these live organisms attached to the surface constitute the biofouling or fouling.

The adhesion of marine fouling concerns any structure immersed in the sea: ships, pipelines, cooling towers and circuits, harbor structures, marine sensors, aquaculture systems, etc. The damage caused is considerable and diverse. Specifically, the structures become coated, for example, with organisms which have a negative effect on the performance levels of the structures.

In particular, for the hulls of ships, the incrustation of various marine organisms increases the friction between the ships' hulls and the seawater, which reduces the speed and can lead to greater fuel consumption. Thus, the bottom of a ship which is not protected by an antifouling system can, after less than six months spent at sea, be covered with 150 kg of fouling per square meter.

In order to avoid this economic loss, and also in order to more successfully inhibit corrosion phenomena, antifouling paints, the objective of which is to prevent or notably reduce the soiling due to the incrustations of marine organisms, are applied to the immersed parts of the structures exposed to water. The principle of antifouling paints is based on the controlled release of the active substance at the interface between the surface and the seawater. The effectiveness of the paint is maintained as long as the concentration of active substance released at the surface is effective and regular. Most antifouling paints therefore contain a biocidal product which is most commonly an organometallic compound (based on tin, on copper or on zinc) or an organic compound (fungicide, algicide, bactericide) which prevents adhesion of the marine soiling owing to the toxic activity thereof.

However, the problem associated with the use of these paints is that they release into the marine environment substances that are harmful to the maritime fauna and flora. In addition, the coatings become increasingly rough and gradually degrade, which increases fuel consumption and increases the hydrodynamic noise emitted by the immersed structure.

This new difficulty has been solved by using self-polishing antifouling paints. In addition to having biocidal agents, these paints exhibit, under the action of surface hydrolysis by the seawater and that of erosion due to the movement of the ship, a regular and controlled loss of thickness over time. The slow erosion of the coating in contact with the seawater makes it possible to constantly refresh the surface with biodical agents.

The self-polishing antifouling paints developed since the 1960s were based on tin salts. They were self-polishing paints formulated from tributyltin (TBT) methacrylate copolymers which have a constant degree of leaching. The TBT grafted to an acrylic binder is released slowly by hydrolysis in water. Examples of this type of paint are described in documents FR-A-2266733, FR-A-2557585, EP-A-0051930 and GB-A-2118196.

Tributyltin (TBT), which is very effective, was therefore the biocide most commonly used in antifouling paints, but this product, its degradation molecules and its metabolites proved to be seriously and sustainably polluting. For these reasons, the International Maritime Organization prohibited the use of tin-based antifouling paints.

The antifouling paints used today are mainly based on copper-containing compounds and/or on synthetic chemical compounds, but also based on silicone polymers.

With regards to the copper-based paints, although they are less toxic than tin salts, they are virtually always formulated with a massive proportion of cuprous oxide (see, for example, document EP-A-051930 or FR-A-2557585), the main binder being based on special polymers generally of the acrylic type. However, they are effective only against the marine fauna, and, in order to combat the growth of algae, it is essential to add herbicides, which can pose new threats to the environment.

This alternative does not therefore provide a sustainable solution for protecting the environment against the considerable discarding of heavy ions, in particular copper ions, following the intensive use of paints which are tin-free but are rich in copper.

Another solution for preventing the soiling of the surfaces of structures in contact with seawater consists in covering these surfaces with at least one protective coating, the external layer of the coating in contact with the water being a silicone elastomer. These coatings are prepared using paints known as "fouling-release coating". The principle of these new antifouling paints is to create a very smooth surface, with a low surface energy, to which the organisms have great difficulty in adhering. When such surfaces are stationary, marine organisms can deposit themselves thereon. However, by virtue of the flexibility and of the low surface tension of the silicone-based topcoat, these organisms are quite simply removed by the force of the movement of the water or the effect of friction caused by the movement of the ship. This also means that, if there is sufficient movement of water around the hull of a ship, a natural self-cleaning effect occurs.

By virtue of these properties, even ships which are less frequently at sea or in waters with less movement benefit from cleaning intervals which are more spaced out. This is due to the fact that the marine organisms have trouble adhering to the surface; which also makes the cleaning easier.

These silicone-based paints forming an antifouling coating are therefore very innovative:
   they are completely friendly to the marine environment: no metal waste, and
   they improve the glide of ships, thus reducing by 1 to 5% their fuel consumption and therefore their greenhouse gas emissions.

There are many patents, for example patents FR-A-2 083 029 and U.S. Pat. No. 3,702,778, describing such coatings of which the topcoat is a hot-cured or cold-cured silicone elastomer.

For example, U.S. patent application Ser. No. 07/847,401, filed on Mar. 6, 1992, describes a three-component antifouling system comprising at least one epoxy primer coat, one adhesion primer coat (tie coat) and one antifouling coat (topcoat) based on a silicone elastomer. The final epoxy primer coat is normally a thin coat which is applied in order to obtain a clean and fresh surface to which the tie coat can adhere. The tie coat comprises an organopolysiloxane and a curing component. The antifouling coat comprises an organpolysiloxane, an alkyl silicate, a curing agent and a tin-based catalyst. The epoxy primer coat(s) is (are) applied directly to the support. The tie coat is applied to the epoxy primer coat(s). The antifouling coat, as a silicone coating, is then applied and crosslinked on the tie coat, after partial curing of the latter.

An antifouling coat (topcoat) based on a silicone elastomer can also comprise exuding compounds which improve the "antifouling" effect, in particular:
   methylphenylpolysiloxane oils (U.S. Pat. No. 4,025,693),
   a hydrocarbon-based liquid compound, for example a polyolefin,
   a plasticizer,
   a lubricating oil (FR-A-2 375 305),
   liquid paraffins and waxy masses of the petrolatum type (JP-A-83/013 673),
   a thermoplastic polymer such as PVC,
   a vinyl chloride/vinyl acetate copolymer (Kokai JP-A-79/026 826), or
   cationic, anionic, nonionic or amphoteric surfactants (JP-A-85/258 271).

In order to form the silicone elastomer coating, the silicone formulations used generally involve a silicone oil, generally a reactive polydimethylsiloxane with hydroxylated endings, which optionally prefunctionalize with a silane so as to have alkoxy ends, a crosslinking agent and a polycondensation catalyst, conventionally a tin salt or an alkyl titanate, a reinforcing filler and optional other additives, such as bulking fillers, adhesion promoters, dyes, etc.

These room-temperature vulcanizing organopolysiloxane compositions are well known and are classified in 2 distinct groups: single-component compositions (RTV-1) and two-component compositions (RTV-2). The term "RTV" is the acronym for "room-temperature vulcanizing".

During crosslinking, water (either provided by atmospheric moisture in the case of RTV-1 compositions, or introduced into one part of the composition in the case of RTV-2 compositions) enables the polycondensation reaction, which results in the formation of the elastomeric network.

Generally, single-component (RTV-1) compositions crosslink when they are exposed to moisture from the air, i.e. they cannot crosslink in an enclosed medium. For example, the single-component silicone compositions cold-crosslink according to a mechanism of hydrolysis of reactive functions of the acetoxysilane, ketiminoxysilane, alkoxysilane, etc., type, followed by condensation reactions between silanol groups formed and other residual reactive functions. The hydrolysis is generally carried out by virtue of the water vapor which diffuses into the material from the surface exposed to the atmosphere. Generally, the kinetics of the polycondensation reactions are extremely slow; these reactions are therefore catalyzed by a suitable catalyst. As catalysts which are used, use is most commonly made of catalysts based on tin, on titanium, on an amine or compositions of these catalysts. Catalysts based on tin (cf. in particular FR-A-2 557 582) and on titanium (cf. in particular FR-A-2 786 497) are catalysts that are very effective. Single-component silicone elastomers with —Si(OR) ends are sometimes referred to as alkoxy elastomers.

As regards two-component compositions, they are sold and stored in the form of two components, a first component containing the base polymer materials and the second component containing the catalyst. The two components are mixed at the time of use and the mixture crosslinks in the form of a relatively hard elastomer. These two-component compositions are well known and are in particular described in the book by Walter Noll "Chemistry and Technology of Silicones" 1968, $2^{nd}$ edition, on pages 395 to 398.

These compositions essentially comprise 4 different ingredients:
   a reactive α,ω-dihydroxydiorganopolysiloxane polymer,
   a crosslinking agent, generally a silane, a silicate or a polysilicate,
   a tin catalyst, and
   water.

Most commonly, the condensation catalyst is based on an organic tin compound. Specifically, many tin-based catalysts have already been proposed as crosslinking catalysts for these RTV-1 or RTV-2 compositions. Conventional polycondensation catalysts comprise dialkyltin compounds, in particular dialkyltin dicarboxylates such as dibutyltin dilaurate and dibutyltin diacetate, alkyl titanate compounds, such as tetrabutyl titanate or tetraisopropyl titanate, or titanium chelates (EP-A-0 885 933, U.S. Pat. No. 5,519,104, U.S. Pat. No. 4,515,932, U.S. Pat. No. 4,563,498, U.S. Pat. No. 4,528,353).

However, the alkyltin-based catalysts, although they are very effective, most commonly colorless, liquid and soluble in silicone oils, have the drawback of being toxic (CMR2 toxic for reproduction).

For sustainable development, it therefore appears to be necessary to develop novel antifouling paints which do not comprise any toxic catalysts.

For example, an important characteristic of a curable silicone composition is the crosslinking kinetics. The time needed to obtain a dry surface (or Tack Free Time) must be short. Tack Free Times of less than one hour are generally required.

Another important characteristic of a curable silicone composition is the working time (pot-life), i.e. the time during which the composition can be used after mixing without curing. This time must be sufficiently long to allow its use, but sufficiently short to obtain a hard coating. For example, for a coating of tie coat or topcoat type, a pot-life of more than 15 minutes is generally required when the external temperature is between 20 and 30° C. Now, one of the means for adjusting this pot-life is the nature of the components used, such as the catalyst.

For all these reasons, novel strategies for combating the adhesion of aquatic fouling, and in particular marine fouling, are being developed today.

SUMMARY OF THE INVENTION

The objective of the invention is to propose an article having antifouling properties by means of coatings obtained using antifouling paints comprising no prohibited components (biocide or catalyst) and containing no tin.

The present invention therefore relates to an article having antifouling properties and intended to be employed in aquatic uses, in particular marine uses, which comprises
a) a support,
b) optionally, at least one primer coat on said support comprising at least one anticorrosive product,
c) optionally, at least one intermediate coat promoting adhesion between the coats,
d) at least one adhesion-promoting coat or "tie coat", deposited on said primer coat or on said support when the primer coat is absent, and
e) at least one antifouling coat or "topcoat", deposited on said adhesion-promoting coat or tie coat, said article being characterized in that the antifouling coat and/or the tie coat is/are prepared from a curable polyorganosiloxane composition R containing no tin, and characterized in that it comprises, firstly, a silicone base B capable of curing by means of a polycondensation reaction so as to give a silicone elastomer and, secondly, a catalytically effective amount of at least one polycondensation catalyst A which is a metal complex or salt of formula (I):

in which:
$l_1 \geq 1$, $l_2 \geq 0$ and $l_1 + l_2 = 3$;
the symbol $L^1$ represents a β-dicarbonylated ligand chosen from the group consisting of a β-dicarbonylato anion or the enolate anion of a β-dicarbonylated compound, and an acetylacetato anion derived from a β-keto ester, with the additional condition that, when $l_1 \geq 2$, the symbols $L^1$ are identical or different; with the additional condition that, when $l_1 = 3$, then the symbol $L^1$ is not acetyl-acetonate (acac), and
the symbol $L^2$ represents an anionic ligand other than $L^1$ and, when $l_2 = 2$, the symbols $L^2$ are identical or different.

DETAILED DESCRIPTION OF A PREFERRED EMBODIMENT

In order to achieve this objective, the applicant has, to its credit, demonstrated, entirely surprisingly and unexpectedly, that the iron complexes corresponding to general formula (I) make it possible to prepare coatings which are useful as a tie coat or topcoat in antifouling uses. The coatings obtained according to the invention have noteworthy adhesion properties on the supports thus treated while at the same time conferring a very smooth treated surface, with a low surface energy, to which the organisms have great difficulty in adhering.

The catalysts according to the invention are used in the silicone systems to be crosslinked at very low contents, and make it possible, according to the content, to adjust the pot-life to the application while at the same time guaranteeing that the elastomers obtained will have excellent hardnesses. The catalyst according to the invention can be in the solid or liquid state. It can be incorporated alone or in a suitable solvent. When it is in a solvent, a silicone oil can be added, and the solvent is subsequently evaporated off so as to transfer the catalyst into a silicone medium. The mixture obtained serves as a catalyzing base.

According to one preferred embodiment of the invention, the β-dicarbonylato ligand $L^1$ is a β-diketonato anion derived from a β-diketone or a β-ketoesterato anion derived from a β-keto ester of formula (II) below:

in which:
$R^1$ represents a substituted or unsubstituted, linear or branched $C_1$-$C_{30}$ hydrocarbon-based radical or a substituted or unsubstituted aromatic;
$R^2$ is a hydrogen or a hydrogen-based radical, in general alkyl, advantageously having at most 4 carbon atoms;
$R^3$ represents a substituted or unsubstituted, linear, cyclic or branched $C_1$-$C_{30}$ hydrocarbon-based radical, a substituted or unsubstituted aromatic, or an —$OR^4$ radical where $R^4$ represents a substituted or unsubstituted, linear, cyclic or branched $C_1$-$C_{30}$ hydrocarbon-based radical, where
$R^1$ and $R^2$ can be linked so as to form a ring, and
$R^2$ and $R^4$ can be linked so as to form a ring.

Among the β-diketones of formula (II) which are particularly advantageous for the composition according to the invention, mention will be made of those chosen from the group consisting of the β-diketones: 2,4-pentanedione (acac); 2,4-hexanedione; 2,4-heptane-dione; 3,5-heptanedione; 3-ethyl-2,4-pentanedione; 5-methyl-2,4-hexanedione; 2,4-octanedione; 3,5-octane-dione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac); benzoylacetone; dibenzoylmethane; 3-methyl-2,4-pentanedione; 3-acetylpentan-2-one; 3-acetyl-2-hexanone; 3-acetyl-2-heptanone; 3-acetyl-5-methyl-2-hexanone; stearoylbenzoylmethane; octanoylbenzoyl-methane; 4-(t-butyl)-4'-methoxydibenzoylmethane; 4,4'-dimethoxydibenzoylmethane and 4,4'-(di-tert-butyl)-dibenzoylmethane.

According to another preferred embodiment of the invention, the β-dicarbonylato ligand $L^1$ is a β-keto-esterato anion chosen from the group consisting of the anions derived from the following compounds: the methyl, ethyl, n-propyl, isopropyl, n-butyl, sec-butyl, isobutyl, tert-butyl, isopentyl, n-hexyl, n-octyl, 1-methylheptyl, n-nonyl, n-decyl and n-dodecyl esters of acetylacetic acid or those described in patent application FR-A-1435882.

In order to explain in a little more detail the nature of the constituent elements of the metal complex A according to the invention, it is important to specify that $L^2$ is an anionic ligand which can be selected from the group consisting of the following anions: fluoro ($F^-$), chloro ($Cl^-$), triiodo($1^-$) ($I_3^-$), difluoro-chlorato($1^-$) [$ClF_2$]$^-$, hexafluoroiodato($1^-$) [$IF_6$]$^-$, oxo-chlorato($1^-$) ($ClO$)$^-$, dioxochlorato($1^-$) ($ClO_2$)$^-$, trioxo-chlorato($1^-$) ($ClO_3$)$^-$, tetraoxochlorato($1^-$) ($ClO_4$)$^-$, hydroxo ($OH$)$^-$, mercapto ($SH$)$^-$, selanido ($SeH$)$^-$, hyperoxo ($O_2$)$^-$, ozonido ($O_3$)$^-$, hydroxo ($OH^-$), hydrodisulfido $(HS_2)^-$, methoxo $(CH_3O)^-$, ethoxo $(C_2H_5O)^-$, propoxido $(C_3H_7O)^-$, methylthio $(CH_3S)^-$, ethanethiolato $(C_2H_5S)^-$, 2-chloroethanolato $(C_2H_4ClO)^-$, phenoxido $(C_6H_5O)^-$, phenylthio $(C_6H_5S)^-$, 4-nitrophenolato $[C_6H_4(NO_2)O]^-$, formato $(HCO_2)^-$, acetato $(CH_3CO_2)^-$, propionato $(CH_3CH_2CO_2)^-$, nitrido $(N_3)^-$, cyano $(CN)^-$, cyanato $(NCO)^-$, thiocyanato $(NCS)^-$, selenocyanato $(NCSe)^-$, amido $(NH_2)^-$, phosphino $(PH_2)^-$, chloroazanido $(ClHN)^-$, dichloroazanido $(Cl_2N)^-$, [methanaminato(1$^-$)] $(CH_3NH)^-$, diazenido $(HN=N)^-$, diazanido $(H_2N-NH)^-$, diphosphenido $(HP=P)^-$, phosphonito $(H_2PO)^-$, phosphinato $(H_2PO_2)^-$, carboxylato, enolato, amides, alkylato and arylato.

According to one particularly preferred embodiment, $L^2$ is an anionic ligand selected from the group consisting of the following anions: acetate, oxalate, propionate, butyrate, isobutyrate, diethylacetate, benzoate, 2-ethylhexanoate, stearate, methoxide, ethoxide, iso-propoxide, tert-butoxide, tert-pentoxide, 8-hydroxy-quinolinate, naphthenate, tropolonate and the oxido $O^{2-}$ anion.

According to one preferred embodiment, the polycondensation catalyst A is a compound chosen from the group consisting of the following molecules (1) to (7):

(1): [Fe(t-Bu-acac)$_3$] with (t-Bu-acac)=the 2,2,6,6-tetramethyl-3,5-heptanedionato anion or the enolate anion of 2,2,6,6-tetramethyl-3,5-heptanedione, (2): [Fe(EAA)$_3$] with EAA=the ethyl acetoacetato anion or the enolate anion of ethyl acetoacetate, (3): [Fe(iPr-AA)$_3$] with iPR-AA=the isopropyl acetoacetato anion or the enolate anion of isopropyl acetoacetate, (4): [Fe(iBu-AA)$_3$] with iBu-AA=the isobutyl acetoacetato anion or the enolate anion of isobutyl acetoacetate, (5): [Fe(tBu-AA)$_3$] with tBu-AA=the tert-butyl acetoacetato anion or the enolate anion of tert-butyl acetoacetate, (6): [Fe(EAA)$_2$ (2-ethylhexanoato)] with EAA=the ethyl acetoacetato anion or the enolate anion of ethyl acetoacetate, and (7): [Fe(EAA) (2-ethylhexanoato)$_2$] with EAA=the ethyl acetoacetato anion or the enolate anion of ethyl acetoacetate.

According to one advantageous embodiment, the polycondensation catalyst A is a compound chosen from the group consisting of the following molecules (4) and (5):

(4): [Fe(iBu-AA)$_3$] with iBu-AA=the isobutyl acetoacetato anion or the enolate anion of isobutyl acetoacetate,

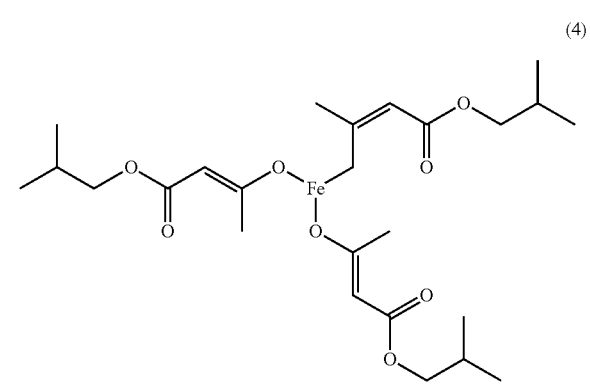

(4)

(5): [Fe(tBu-AA)$_3$] with tBu-AA=the tert-butyl acetoacetato anion or the enolate anion of tert-butyl acetoacetate,

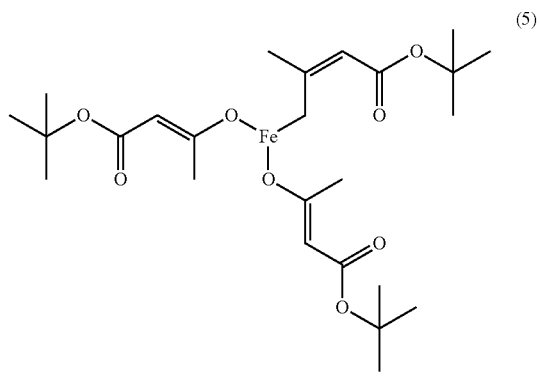

(5)

The amount of polycondensation catalyst A according to the invention is between 0.01% and 10% by weight of the total mass, preferably between 0.1% and 50, whether it is a single-component or two-component preparation.

Any material which is used in an aquatic environment and which is subject to soiling can be a support for the present invention. Possible supports are materials for constructing boats, such as stainless steel, aluminum, wood, glass fibers impregnated with resin and any other composite material. The materials used for canalizations, such as concrete, plastics, steel and iron and other metals can also be coated. Pools containing water, including swimming pools, are subject to soiling. The materials used for manufacturing pools are identical or similar to those used for manufacturing canalizations.

The support may or may not be coated with a primer coat comprising at least one anticorrosive product. This anticorrosive coat contains an anticorrosive product, which can be any product that inhibits corrosion or degradation of the support subsequent to a reaction with its environment. Such anticorrosive products are well known in the art. They are in two-component form, comprising a base product with an epoxy function and a curing catalyst. The anticorrosive coat normally has a thickness of between 0.10 and 0.75 mm.

The intermediate primer coat promoting adhesion between the coats can be prepared from known and/or commercial products. Generally, they are prepared from two-component products based on epoxy-amine systems and known to those skilled in the art.

Examples of compositions for preparing an anticorrosive coat or an intermediate adhesion-promoting primer coat are described in the handbook "Protective Coatings, Fundamentals of Chemistry and Composition", by C. H. Hare, published by Technology Publishing Company, Pittsburgh, 1994.

Each of the coats of the article according to the invention can be applied by processes well known in the art. Such processes comprise application with a brush, spraying, dipping, application with a roller, or any process normally used for applying a paint. In addition, the various coats of the article according to the invention are dried according to the usual practices in this art.

When an antifouling coat (or topcoat) according to the invention is used, it can be combined with an adhesion-promoting coat (or tie coat) of diverse and varied nature. When the adhesion-promoting coat (or tie coat) is not prepared from a composition according to the invention, then this undercoat may be of diverse and varied nature. For example, it can be made of polyurethane, of natural or synthetic rubber which is optionally chlorinated, such as chloroprene and neoprene, or of butyral/silicone rubber (Kokai JP-A-78/137 231, JP-A-78/137 233 and JP-A-78/137 234). According to another approach, for example described in U.S. Pat. No. 5,449,553, a tie coat is described and is prepared from an air-moisture-curable composition comprising a tin-based polycondensation catalyst, a crosslinking agent such as ethyl silicate and a copolymer derived from the product of reacting an organopolysiloxane with a silylhydroxy ending with a polymerizable monomer such as a styrene or a conjugated diolefin, for instance 1,3-butadiene. According to another example, described in patent EP-1670866, a tie coat is formed from a composition comprising:
  (i) from 0 to 60% by wet weight of pigments and of fillers; and
  (ii) the rest being made up of a binder-based phase comprising:
    from 1% to 90% by wet weight of one or more polysiloxanes comprising an amine function,
    from 1% to 90% by wet weight of one or more polysiloxanes comprising an epoxy function, and
    from 0 to 20% by wet weight of an adhesion promoter chosen from the group consisting of polysiloxanes comprising a hydroxyl function, polysiloxanes comprising a hydroxyalkyl function and polysiloxanes comprising a $C_1$-$C_4$ alkoxy function.

Other examples of conventional tie coats are described in U.S. Pat. No. 4,861,670.

According to one particularly preferred embodiment, the polyorganosiloxane composition which is curable so as to form the antifouling coat also comprises a catalytically effective amount of at least one polycondensation catalyst A according to the invention and as defined above and a silicone base B comprising:
  at least one polyorganosiloxane oil C capable of crosslinking by means of polycondensation so as to give an elastomer;
  at least one compound L which exudes at the surface of the antifouling coat when the elastomer network is formed, thus improving the "antifouling" effect;
  at least one crosslinking agent D;
  optionally, at least one adhesion promoter E;
  optionally, at least one siliceous, organic and/or nonsiliceous mineral filler F, and
  optionally, at least one pigment, one coloring base or one coloring agent H, and
  optionally, at least one solvent K.

Examples of compounds L which exude at the surface of the antifouling coat when the elastomer network is formed, thus improving the "antifouling" effect, are for example:
  a) polyorganosiloxane oils corresponding to general formula (II) below:

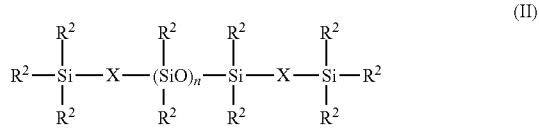

(II)

in which:
  $R^2$ is an alkyl, aryl or alkenyl radical, methyl and phenyl radicals being preferred (a particularly preferred example being a methylphenylpolysiloxane oil as described, for example, in U.S. Pat. No. 4,025,693),
  X is an oxygen atom or a divalent hydrocarbon-based group containing from 1 to 8 carbon atoms,
  n is a number defined so as to obtain a diorganopolysiloxane having a viscosity between 10 and $1 \times 10^6$ mm²/s at 25° C.

These polyorganosiloxane oils can optionally be grafted and comprise acrylic, amide, amine, carbonyl, carboxylic, carboxylate, thiol, thioether, urea, quaternary ammonium, fluoroalkyl or perfluoroalkyl groups.

Grafted or block polydimethylsiloxane oils comprising at least one polyether block (with, for example, polyethylene glycol and/or polypropylene glycol groups) can also be used,
  b) a hydrocarbon-based liquid compound: for example a polyolefin such as an ethylene/propylene copolymer, and in particular a low-molecular-weight polyisobutene (up to 5000 g/mol and preferably between 300 and 500 g/mol),
  c) an organic liquid compound chosen from polydienes, polyesters, polyisocyanates, polyurethanes, polyepoxides, fluoroalkyls, fluoroethers, lubricating oils (see, for example, patent FR-A-2 375 305), and plasticizers (for example fatty acid esters which can optionally be substituted with heteroatoms or phosphoric acid esters or halohydrocarbon-based compounds). Polyethylene glycols, polypropylene glycols or castor oil can also be used, and they also provide anti-run properties during the application of the composition,
  d) liquid paraffins and wax masses of the petrolatum type (JP-A-83/013 673),
  e) a thermoplastic polymer such as PVC,
  f) a vinyl chloride/vinyl acetate copolymer (Kokai JP-A-79/026 826), or
  g) cationic, anionic, nonionic or amphoteric surfactants (JP-A-85/258 271).

Examples of solvents K are, for example: aliphatic, cycloaliphatic or aromatic hydrocarbon-based derivatives, such as white spirit, cyclohexane, toluene, octamethyltrisiloxane or xylene, and ester solvents such as methoxypropyl acetate, n-butyl acetate and 2-ethoxyethyl acetate, and also mixtures thereof. The amount of solvent is determined according to the use or the support to be treated, in such a way as to obtain a paint with acceptable viscosity.

Description of the Silicone Base B:

The silicone bases used in the present invention, which crosslink and cure by means of polycondensation reactions, are well known. These bases are described in detail, in particular, in many patents, and they are commercially available.

These silicone bases may be single-component, i.e. packaged in a single packaging, and stable during storage in the absence of moisture, and curable in the presence of moisture, in particular moisture provided by the ambient air or by the water generated within the base during its use.

Single-component bases are described in detail, for example, in patents EP 141 685, EP 147 323, EP 102 268, EP 21 859, FR 2 121 289 and FR 2 121 631, cited by way of reference. Two-component bases are described in detail, for example, in patents EP 118 325, EP 117 772, EP 10 478, EP 50 358, EP 184 966, U.S. Pat. No. 3,801,572 and U.S. Pat. No. 3,888,815, cited by way of reference.

In addition to single-component bases, it is possible to use two-component bases, i.e. bases packaged in two packagings, which cure as soon as the polycondensation catalyst according to the invention is incorporated. They are packaged after incorporation of the catalyst in two separate fractions, it being possible for one of the fractions to contain, for example, only the catalyst according to the invention or a mixture with the crosslinking agent.

The polyorganosiloxane oil C is preferably an α,ω-dihydroxypolydiorganosiloxane polymer having a viscosity of between 50 and 5 000 000 mPa·s at 25° C., and the crosslinking agent D is preferably an organosilicon compound bearing more than two hydrolyzable groups bonded to the silicon atoms per molecule. The polyorganosiloxane oil C can also be functionalized at its ends with hydrolyzable radicals obtained by condensation of a precursor bearing hydroxyl functions with a crosslinking silane bearing hydrolyzable radicals. This polyorganosiloxane oil C capable of crosslinking by polycondensation so as to give an elastomer can optionally be grafted with at least one polyether block (with, for example, polyethylene glycol and/or polypropylene glycol groups), polyacrylate block or polymethacrylate block.

As crosslinking agent D, mention may be made of:
silanes having the following general formula (and the products of partial hydrolysis of this silane):

$$R^1_k Si(OR^2)_{(4-k)}$$

in which:
the symbols $R^1$, which may be identical or different, represent $C_1$-$C_{10}$ hydrocarbon-based radicals encompassing:
$C_1$-$C_{10}$ alkyl radicals such as methyl, ethyl, propyl, butyl, pentyl, 2-ethylhexyl, octyl and decyl radicals,
vinyl, allyl and hexenyl radicals, and
$C_5$-$C_8$ cycloalkyl radicals such as phenyl, tolyl and xylyl radicals,
the symbols $R^2$, which may be identical or different, represent alkyl radicals having from 1 to 8 carbon atoms, such as methyl, ethyl, propyl, butyl, pentyl or 2-ethylhexyl radicals, or $C_3$-$C_6$ oxyalkylene radicals, and k is equal to 0, 1 or 2.

As examples of $C_3$-$C_6$ alkoxyalkylene radicals, mention may be made of the following radicals:

$CH_3OCH_2CH_2$ $—CH_3OCH_2CH(CH_3)—$ $CH_3OCH(CH_3)CH_2—$ $—C_2H_5OCH_2CH_2CH_2—$

The crosslinking agents D are products that are accessible on the silicones market; in addition, their use in room temperature curing compositions is known; it appears in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Among the crosslinking agents D, preference is more particularly given to alkyltrialkoxysilanes, alkyl silicates and alkyl polysilicates, in which the organic radicals are alkylated radicals having from 1 to 4 carbon atoms.

As other examples of crosslinking agents D which can be used, mention may more particularly be made of the following silanes:
propyltrimethoxysilane,
methyltrimethoxysilane,
ethyltrimethoxysilane,
vinyltriethoxysilane,
methyltriethoxysilane,
propyltriethoxysilane,
tetraethoxysilane,
tetrapropoxysilane,
silanes of 1,2-bis(trialkoxysilyl)ethane type, such as:
1,2-bis(trimethoxysilyl)ethane or 1,2-bis(tri-ethoxysilyl)ethane,
tetraisopropoxysilane,
or else: $CH_3Si(OCH_3)_3$; $C_2H_5Si(OC_2H_5)_3$; $C_2H_5Si(OCH_3)_3$ $CH_2$=$CHSi(OCH_3)_3$; $CH_2$=$CHSi(OCH_2CH_2OCH_3)_3$, $C_6H_5Si$—$(OCH_3)_3$; $[CH_3][OCH(CH_3)CH_2OCH_3]Si$ $[OCH_3]_2$, $Si(OCH_3)_4$; $Si(OC_2H_5)_4$; $Si(OCH_2CH_2CH_3)_4$; $Si(OCH_2CH_2CH_2CH_3)_4$, $Si(OC_2H_4OCH_3)_4$; $CH_3Si(OC_2H_4OCH_3)_3$; $ClCH_2Si(OC_2H_5)_3$.

As other examples of crosslinking agent D, mention may be made of ethyl polysilicate or n-propyl polysilicate.

Other crosslinking agents D which can also be used are silanes having the following general formula (and the products of partial hydrolysis of this silane):

$$R^1_k Si(Y)_{(4-k)}$$

in which:
the symbols $R^1$, which may be identical or different, are as defined above,
the symbols Y, which may be identical or different, represent hydrolyzable groups such as, for example, amino, amido, aminoxy, oxime, acyloxy and alkenyloxy groups.

From 0.1 to 60 parts by weight of crosslinking agent D per 100 parts by weight of polyorganosiloxane C capable of crosslinking by polycondensation to give an elastomer, are generally used.

Thus, the composition according to the invention may comprise at least one adhesion promoter E such as, for example, organosilicon compounds bearing both:
(1) one or more hydrolyzable groups bonded to the silicon atom, and
(2) one or more organic groups substituted with radicals comprising a nitrogen atom or chosen from the group of (meth)acrylate, epoxy and alkenyl radicals, and even more preferably from the group consisting of the following compounds taken alone or as a mixture:
vinyltrimethoxysilane (VTMO),
3-glycidoxypropyltrimethoxysilane (GLYMO),
methacryloxypropyltrimethoxysilane (MEMO), $[H_2N(CH_2)_3]Si(OCH_2CH_2CH_3)_3$. $[H_2N(CH_2)_3]Si(OCH_3)_3$ $[H_2N(CH_2)_3]Si(OC_2H_5)_3$ $[H_2N(CH_2)_4]Si(OCH_3)_3$ $[H_2NCH_2CH(CH_3)CH_2CH_2]SiCH_3(OCH_3)_2$ $[H_2NCH_2]Si(OCH_3)_3$ $[n\text{-}C_4H_9\text{—}HN\text{—}CH_2]Si(OCH_3)_3$ $[H_2N(CH_2)_2NH(CH_2)_3]Si(OCH_3)_3$ $[H_2N(CH_2)_2NH(CH_2)_3]Si(OCH2CH_2OCH_3)_3$ $[CH_3NH(CH_2)_2NH(CH_2)_3]Si(OCH_3)_3$ $[H(NHCH_2CH_2)_2NH(CH_2)_3]Si(OCH_3)_3$ $H_2(CH_2)NH(CH_2)_3Si(OCH_3)_2$
          |
          $OCH(CH_2)CHOCH_3$
$H_2(CH_2)NH(CH_2)_3Si\text{—}CH\text{=}CH_2$
          |
          $(OCH_3)_2$ silanes of 3-ureidopropyltrialkoxysilane type, such as:
3-ureidopropyltriethoxysilane or 3-ureido-propyltrimethoxysi lane,
or polyorganosiloxane oligomers containing such organic groups at a content greater than 20%.

For the single- and two-component bases, very finely divided products, the average particle diameter of which is less than 0.1 µm, are used as mineral fillers F. Among these fillers are fumed silicas and precipitated silicas; their BET specific surface area is generally greater than 40 m²/g. These fillers can also be in the form of more coarsely divided products, of average particle diameter greater than 0.1 µm. As examples of such fillers, mention may be made of ground quartz, diatomaceous silicas, calcium carbonate, calcined clay, rutile-type titanium oxide, iron, zinc, chromium, zirconium or magnesium oxides, the various forms of alumina (hydrated or unhydrated), boron nitride, lithopone, barium metaborate, barium sulfate and glass microbeads; their specific surface area is generally less than 30 m²/g.

These fillers may have been surface-modified by treatment with the various organosilicon compounds customarily used for this purpose. Thus, these organosilicon compounds may be organochlorosilanes, diorgano-cyclopolysiloxanes, hexaorganodisiloxanes, hexaorgano-disilazanes or diorganocyclopolysilazanes (French patents FR-A-1 126 884, FR-A-1 136 885 and FR-A-1 236 505, and British patent GB-A-1 024 234). The treated fillers contain, in most cases, from 3% to 300 of their weight of organosilicon compounds. The fillers may consist of a mixture of several types of fillers of different particle size; thus, for example they may consist of from 30% to 70% of finely divided silicas with a BET specific surface area of greater than 40 m²/g and of from 70% to 300 of more coarsely divided silicas with a specific surface area of less than 30 m²/g.

The purpose of introducing fillers is to give good mechanical and rheological properties to the elastomers that result from the curing of the compositions in accordance with the invention.

In combination with these fillers, use may be made of mineral and/or organic pigments. Examples of pigments H are, by way of indication: red iron oxide, zinc oxide, carbon black, graphite, yellow iron oxide, titanium oxide white, chromium oxide, cobalt oxide, litharge, ultramarine and molybdenum red and yellow, or known organic pigments widely used in the aquatic paints field.

Other customary auxiliary agents and additives (thixotroping agents, anti-run agents, etc.) can be incorporated into the composition according to the invention.

In addition to the main constituents, nonreactive linear polyorganosiloxane polymers G can be introduced, preferably with the aim of acting on the physical characteristics of the compositions in accordance with the invention and/or on the mechanical properties of the elastomers resulting from the curing of these compositions.

These nonreactive linear polyorganosiloxane polymers G are well known; they comprise more especially: α,ω-bis-(triorganosiloxy)diorganopolysiloxane polymers having viscosities of at least 10 mPa·s at 25° C., formed essentially from diorganosiloxy units and from at most 1% of monoorganosiloxy and/or siloxy units, the organic radicals bonded to the silicon atoms being chosen from methyl, vinyl and phenyl radicals, at least 60% of these organic radicals being methyl radicals and at most 10% being vinyl radicals. The viscosity of these polymers can reach several tens of millions of mPa·s at 25° C.; they therefore comprise oils with a fluid-to-viscous appearance and soft-to-hard gums. They are prepared according to the usual techniques described more specifically in French patents FR-A-978 058, FR-A-1 025 150, FR-A-1 108 764 and FR-A-1 370 884. The α,ω-bis(trimethylsiloxy)dimethylpolysiloxane oils having a viscosity ranging from 10 mPa·s to 1000 mPa·s at 25° C. are preferably used. These polymers which act as plasticizers can be introduced in a proportion of at most 70 parts, preferably from 5 to 20 parts, per 100 parts of polyorganosiloxane oil C capable of crosslinking by polycondensation.

The compositions according to the invention can also comprise at least one silicone resin H1. These silicone resins are branched organopolysiloxane polymers which are well known and commercially available. They have, per molecule, at least two different units chosen from those of formulae $R'''_3SiO_{1/2}$ (M unit), $R'''_2SiO_{2/2}$ (D unit), $R'''SiO_{3/2}$ (T unit) and $SiO_{4/2}$ (Q unit). The R''' radicals are identical or different and are chosen from linear or branched alkyl radicals, and vinyl, phenyl and 3,3,3-trifluoropropyl radicals. Preferably, the alkyl radicals have from 1 to 6 carbon atoms inclusive. More particularly, as alkyl radicals R, mention may be made of methyl, ethyl, isopropyl, tert-butyl and n-hexyl radicals. These resins are preferably hydroxylated and, in this case, have a hydroxyl group weight content of between 5 and 500 meq/100 g.

As examples of resins, mentioned may be made of MQ resins, MDQ resins, DT resins and MDT resins.

In order to produce the compositions in accordance with the invention, it is necessary, in the case of the single-component compositions, to use equipment which makes it possible to intimately mix, away from moisture with or without the input of heat, the various fundamental constituents to which the above-mentioned adjuvants and additives are optionally added. All these ingredients can be charged to the equipment in any order of introduction.

The invention also relates to a method for applying an antifouling coating to a support intended to be employed in aquatic uses, characterized in that it comprises the following steps:

a) optionally, the application of at least one primer coat to said support comprising at least one anticorrosive product, b) optionally, the application of at least one intermediate primer coat promoting adhesion between the coats and curing of said primer coat, c) the application of an adhesion-promoting coat or tie coat to said primer coat or to said support when the primer coat is absent, d) the curing of said tie coat, e) the application of an antifouling coat or topcoat, and f) the curing of said antifouling coat, said method being characterized in that the antifouling coat and/or the tie coat is/are prepared from a curable polyorganosiloxane composition R according to the invention and as described above.

The thickness of the coats applied can vary and film-coatings 12 to 1000 microns thick (with the proviso that the deposit is homogeneous) have given good results. The standard thickness of the various coats is approximately 50 µm for the primer, 150 µm for the tie coat and 150 µm for the topcoat. Of course, those skilled in the art will be able to adjust the thickness of the various coats according to the desired result.

The final subject of the invention relates to the use of a curable polyorganosiloxane composition R according to the invention and as described above, for forming a tie coat adhesion-promoting coating or a topcoat antifouling coating of a paint intended for protecting an article against the adhesion of aquatic organisms.

Further advantages and characteristics of the present invention will become apparent on reading the following examples which are given by way of unlimiting illustration.

Examples

I) Preparation of the Catalysts (3) and (4) According to the Invention (4): [Fe(iBu-AA)$_3$] with iBu-AA=the isobutyl acetoacetato anion or the enolate anion of isobutyl acetoacetate,
(5): [Fe(tBu-AA)$_3$] with tBu-AA=the tert-butyl acetoacetato anion or the enolate anion of tert-butyl acetoacetate A solution of 112 mmol of sodium methoxide (6 g) in 100 ml of ethanol is concentrated by 20% by distillation, and then 112.5 mmol of the β-keto ester (tert-butyl acetoacetate or isobutyl acetoacetate) are added and the solution obtained is heated at 80° C. for 1 h, so as to give a clear orangey yellow solution. A solution of 37.1 mmol of anhydrous iron chloride (6 g) in 20 ml of ethanol is added at 80° C. for 30 min, then the mixture is heated at 80° C. for 3 h, cooled, filtered if necessary, and concentrated to dryness, the residue is taken up with 100 ml of diisopropyl ether and the heterogeneous mixture is filtered through celite. After evaporation to dryness the products (4) and (5) are obtained.

II) Catalyst Activity

In order to demonstrate the catalytic activity of these iron complexes, a simple test was developed. The process is carried out in the following way:

The α,ω-dihydroxylated oil, then the catalyst, then the crosslinking agent are successively placed in a small open cylindrical container which has a magnetic bar, and the stirring is set at 300 rpm. The following times were measured: the time when the stirring stops, which corresponds to a viscosity of 1000 cP (or mPa) approximately, then the time for the oil to no longer flow, the tack-free skin-over time and the core-crosslinking time.

The activity of the novel catalysts is compared to that of tetrabutyldistannoxane dilaurate or Tegokat 225, one of the fastest dialkyltin catalysts (1.24 mmol in Sn equivalent).

The amounts used in the examples below are the following:
  4.48 g of 48V100 oil at 0.553 mmol OH/g (viscosity 100 cP or mPa),
  1.24 mmol of the test catalyst (½ eq./OH),
  0.52 g of ethyl silicate (1 eq./OH).

The catalysts according to the invention have crosslinking times which are slightly longer than the alkyltin-based catalyst (comparative 1) but compatible with the desired application. On the other hand, comparative test 2 shows that the Fe(acac)$_3$ known from the prior art results in a tack time of more than 6 hours and a crosslinking time of more than 7 hours, which is not acceptable for this type of application.

III) Preparation of Two "Topcoats" According to the Invention

Formulation 1: all the amounts are expressed in parts by weight.
  80 parts α,ω-dihydroxylated polydimethylsiloxane oil having a viscosity of 3500 centipoises
  10 parts ethyl silicate
  5 parts methylphenylpolysiloxane oil sold by the company Bluestar Silicones under the name Rhodorsil Huile 510V100®
  2 parts methylphenylpolysiloxane oil sold by the company Bluestar Silicones under the name Rhodorsil Huile 550®
  3 parts Aerosil 200® silica sold by the company Degussa
  1 part castor oil
  0.7 part Bayferrox 130F® pigment sold by the company Bayer
  0.1 part Disperbyk 140® dispersant sold by the company Byk
  20 parts xylene
Added to this formulation are the following:
  either 3.34 mmol of the catalyst (4): [Fe (iBu-AA)$_3$] with iBu-AA=the isobutyl acetoacetato anion or the enolate anion of isobutyl acetoacetate,
  or 3.34 mmol of the catalyst (5): [Fe(tBu-AA)$_3$] with tBu-AA=the tert-butyl acetoacetato anion or the enolate anion of tert-butyl acetoacetate.

The times necessary for obtaining a dry surface (or Tack Free Time) and also the pot life corresponding to these three formulations are detailed in the following table.

TABLE I

| Catalyst tested | Tack Free Time (min) | Pot-life (min) |
|---|---|---|
| Catalyst (4) 3.34 mmol formulation (1) | 45 | 45 |

| | Metal | Catalyst | Time when stirring stops (h:min) | Time to end of flow-ability (h:min) | Tack-free time (h:min) | Cross-linking time (h:min) | Hard/liquid after 24 h |
|---|---|---|---|---|---|---|---|
| Comparative 1 | Sn | Dibutyllauratedi-stannoxane (Tegokat 225) | 00:20 | 00:30 | 00:42 | 00:42 | hard |
| Comparative 2 | Fe | Fe (acac)$_3$ | 06:00 | 06:30 | 06:50 | between 7 and 24 h | hard |
| Catalyst (2) Invention | Fe | Fe (EAA)$_3$ | 01:35 | 01:50 | 01:50 | 02:00 | hard |
| Catalyst (6) Invention | Fe | Fe (2-ethyl-hexanoate)- (EAA)$_2$ | 00:35 | 00:42 | 00:49 | 01:46 | hard |
| Catalyst (7) Invention | Fe | Fe (2-ethyl-hexanoate)$_2$-(EAA) | 01:10 | 01:10 | 01:10 | 01:46 | hard |

TABLE I-continued

| Catalyst tested | Tack Free Time (min) | Pot-life (min) |
| --- | --- | --- |
| Catalyst (5) 3.34 mmol formulation (2) | 10 | 20 |

"Tack free time" = time necessary to obtain a dry surface.

IV) Antifouling Evaluation

A metal sheet made of sandblasted and degreased steel is coated with an epoxy primer coat (prepared from SigmaShield 610® sold by the company Sigmakalon) approximately 50 μm thick. After drying for 72 hours at ambient temperature, a tie coat (prepared from SigmaGlide 790® sold by the company Sigmakalon) approximately 150 microns thick is applied. After drying for 48 hours at ambient temperature, a coat of approximately 150 μm of the topcoat prepared according to formulations 1 and 2 described above in paragraph III) is applied.

After drying for 48 hours at ambient temperature, the sheet is immersed in a marine medium (in seawater) and is examined after 12 and 23 weeks of immersion.

After abundantly washing with water, the antifouling evaluation is 100, which indicates a complete absence of organisms on the coated sheet.

The invention claimed is:

1. An article having antifouling properties and intended to be employed in aquatic uses which comprises:
   a) a support which is used in an aquatic environment and is subject to soiling,
   b) optionally, at least one primer coat on said support comprising at least one anticorrosive product,
   c) optionally, at least one intermediate primer coat promoting adhesion between the coats,
   d) at least one adhesion-promoting coat or tie coat, deposited on said primer coat or on said support when the primer coat is absent, and
   e) at least one antifouling coat deposited on said adhesion-promoting coat or tie coat,
   wherein the antifouling coat and/or the tie coat is/are prepared from a curable polyorganosiloxane composition R containing no tin, and which comprises, firstly, a silicone base B capable of curing by means of a polycondensation reaction so as to give a silicone elastomer and, secondly, a catalytically effective amount of a polycondensation catalyst A selected from the group consisting of one or more of:
   (1): [Fe (t-Bu-acac)$_3$] with (t-Bu-acac) a 2,2,6,6-tetramethyl-3,5-heptanedionato anion or a enolate anion of 2,2,6,6-tetramethyl-3,5-heptanedione,
   (4): [Fe (iBu-AA)$_3$] with iBu-AA an isobutyl acetoacetato anion or an enolate anion of isobutyl acetoacetate,
   (5): [Fe (tBu-AA)$_3$] with tBu-AA a tert-butyl acetoacetato anion or an enolate anion of tert-butyl acetoacetate,
   (6): [Fe (EAA)$_2$ (2-ethylhexanoato)] with EAA an ethyl acetoacetato anion or an enolate anion of ethyl acetoacetate, and
   (7): [Fe (EAA) (2-ethylhexanoato)$_2$] with EAA an ethyl acetoacetato anion or an enolate anion of ethyl acetoacetate
   wherein the silicone base B comprises:
   at least one polyorganosiloxane oil C capable of crosslinking by polycondensation so as to give an elastomer;
   at least one crosslinking agent D;
   at least one compound which exudes at the surface of the antifouling coat when the elastomer network is formed, thus improving the "antifouling" effect;
   optionally, at least one adhesion promoter E;
   optionally, at least one siliceous, organic and/or nonsiliceous mineral filler F, and
   optionally, at least one coloring base and/or coloring agent H, and
   optionally, at least one solvent K,
   wherein the article contains no tin catalyst.

2. The article as claimed in claim 1, in which the polycondensation catalyst A is a compound chosen from the group consisting of the following
   (4): [Fe (iBu-AA)$_3$] with iBu-AA the isobutyl acetoacetato anion or the enolate anion of isobutyl acetoacetate,
   (5): [Fe (tBu-AA)$_3$] with tBu-AA the tert-butyl acetoacetato anion or the enolate anion of tert-butyl acetoacetate,
   (6): [Fe (EAA)$_2$ (2-ethylhexanoato)] with EAA the ethyl acetoacetato anion or the enolate anion of ethyl acetoacetate, and
   (7): [Fe (EAA) (2-ethylhexanoato)$_2$] with EAA the ethyl acetoacetato anion or the enolate anion of ethyl acetoacetate.

3. The article as claimed in claim 1, wherein the support comprises material for constructing boats or pools.

4. The article as claimed in claim 1, wherein at least one primer coat b) is present.

5. The article as claimed in claim 1, wherein at least one intermediate primer coat c) is present.

6. The article as claimed in claim 1, wherein said adhesion promoter E is present.

7. The article as claimed in claim 1, wherein said filler F is present.

8. The article as claimed in claim 1, wherein the antifouling coat is prepared from said curable polyorganosiloxane composition R.

9. The article as claimed in claim 1, wherein the tie coat is prepared from a curable polyorganosiloxane composition R.

10. The article as claimed in claim 1, wherein the antifouling coat and the tie coat are prepared from a curable polyorganosiloxane composition R.

11. The article as claimed in claim 1, wherein the curable polyorganosiloxane composition R consists of said silicone base B and a catalytically effective amount of said polycondensation catalyst A.

12. The article as claimed in claim 1, wherein the polyorganosiloxane oil C consists of one or more alpha,omega-dihydroxypolydiorganosiloxane polymers having a viscosity of between 50 and 5,000,000 mPa·s at 25 C.

13. A method of using the article as claimed in claim 1, comprising immersing the article in an aquatic environment.

14. The method as claimed in claim 13, in which the polycondensation catalyst A is a compound chosen from the group consisting of the following molecules
   (4): [Fe (iBu-AA)$_3$] with iBu-AA the isobutyl acetoacetato anion or the enolate anion of isobutyl acetoacetate,
   (5): [Fe (tBu-AA)$_3$] with tBu-AA the tert-butyl acetoacetato anion or the enolate anion of tert-butyl acetoacetate,
   (6): [Fe (EAA)$_2$ (2-ethylhexanoato)] with EAA the ethyl acetoacetato anion or the enolate anion of ethyl acetoacetate, and (7): [Fe (EAA) (2-ethylhexanoato)$_2$] with EAA the ethyl acetoacetato anion or the enolate anion of ethyl acetoacetate.

15. A method for preparing an article of claim 1, said method comprising:
   a) optionally, the application of at least one primer coat to said support comprising at least one anticorrosive product,
   b) optionally, the application of at least one intermediate primer coat promoting adhesion between the coats and curing of said primer coat,
   c) the application of an adhesion-promoting coat or tie coat to said primer coat or to said support when the primer coat is absent,
   d) the curing of said tie coat,
   e) the application of an antifouling coat, and
   f) the curing of said antifouling coat,
wherein the antifouling coat and/or the tie coat is/are prepared from said curable polyorganosiloxane composition R.

16. The method as claimed in claim 15, wherein the support comprises material for constructing boats or pools.

17. The method as claimed in claim 15, in which the polycondensation catalyst A is a compound chosen from the group consisting of the following molecules
   (4): [Fe (iBu-AA)$_3$] with iBu-AA the isobutyl acetoacetato anion or the enolate anion of isobutyl acetoacetate,
   (5): [Fe (tBu-AA)$_3$] with tBu-AA the tert-butyl acetoacetato anion or the enolate anion of tert-butyl acetoacetate,
   (6): [Fe (EAA)$_2$ (2-ethylhexanoato)] with EAA the ethyl acetoacetato anion or the enolate anion of ethyl acetoacetate, and
   (7): [Fe (EAA) (2-ethylhexanoato)$_2$] with EAA the ethyl acetoacetato anion or the enolate anion of ethyl acetoacetate.

18. A method for applying an antifouling coating to a support intended to be employed in aquatic uses said method comprising:
   a) optionally, the application of at least one primer coat to said support comprising at least one anticorrosive product,
   b) optionally, the application of at least one intermediate primer coat promoting adhesion between the coats and curing of said primer coat,
   c) the application of an adhesion-promoting coat or tie coat to said primer coat or to said support when the primer coat is absent,
   d) the curing of said tie coat,
   e) the application of an antifouling coat, and
   f) the curing of said antifouling coat,
wherein the antifouling coat and/or the tie coat is/are prepared from a curable polyorganosiloxane composition R contains no tin, and which comprises, firstly, a silicone base B capable of curing by means of a polycondensation reaction so as to give a silicone elastomer and, secondly, a catalytically effective amount of a polycondensation catalyst A selected from the group consisting of one or more of:
   (1): [Fe (t-Bu-acac)$_3$] with (t-Bu-acac) a 2,2,6,6-tetramethyl-3,5-heptanedionato anion or an enolate anion of 2,2,6,6-tetramethyl-3,5-heptanedione,
   (4): [Fe (iBu-AA)$_3$] with iBu-AA an isobutyl acetoacetato anion or an enolate anion of isobutyl acetoacetate,
   (5): [Fe (tBu-AA)$_3$] with tBu-AA a tert-butyl acetoacetato anion or an enolate anion of tert-butyl acetoacetate,
   (6): [Fe (EAA)$_2$ (2-ethylhexanoato)] with EAA an ethyl acetoacetato anion or an enolate anion of ethyl acetoacetate, and
   (7): [Fe (EAA) (2-ethylhexanoato)$_2$] with EAA an ethyl acetoacetato anion or an enolate anion of ethyl acetoacetate, wherein the support comprises a material which is used in an aquatic environment and is subject to soiling,
wherein the method does not use a tin catalyst.

19. The method as claimed in claim 18, wherein the support comprises material for constructing boats or pool.

20. An article having antifouling properties and intended to be employed in aquatic uses which comprises:
   a) a support which is used in an aquatic environment and is subject to soiling,
   b) optionally, at least one primer coat on said support comprising at least one anticorrosive product,
   c) optionally, at least one intermediate primer coat promoting adhesion between the coats,
   d) at least one adhesion-promoting coat or tie coat, deposited on said primer coat or on said support when the primer coat is absent, and
   e) at least one antifouling coat deposited on said adhesion-promoting coat or tie coat,
wherein the antifouling coat and/or the tie coat is/are prepared from a curable polyorganosiloxane composition R containing no tin, and which comprises, firstly, a silicone base B capable of curing by means of a polycondensation reaction so as to give a silicone elastomer and, secondly, a catalytically effective amount of a polycondensation catalyst A selected from the group consisting of one or more of metal complex or salt of formula (I):

$$[Fe(L^1)_{l_1}^2)_{l_2}] \tag{I}$$

in which:

the symbol $L^1$ represents a β-dicarbonylated ligand chosen from the group consisting of a β-dicarbonylato anion, the enolate anion of a β-dicarbonylated compound, and an acetylacetato anion derived from a β-keto ester, with the additional condition that, when $l_1 \geq 2$, the symbols $L^1$ are identical or different; and
   the symbol $L^2$ represents an anionic ligand other than $L^1$ and, when $l_2=2$, the symbols $L^2$ are identical or different,
wherein the silicone base B comprises:
   at least one polyorganosiloxane oil C capable of crosslinking by polycondensation so as to give an elastomer;
   at least one crosslinking agent D;
   at least one compound which exudes at the surface of the antifouling coat when the elastomer network is formed, thus improving the "antifouling" effect;
   optionally, at least one adhesion promoter E;
   optionally, at least one siliceous, organic and/or nonsiliceous mineral filler F, and
   optionally, at least one coloring base and/or coloring agent H, and
   optionally, at least one solvent K,
wherein the article contains no tin catalyst.

* * * * *